US012130804B2

(12) United States Patent
Turner

(10) Patent No.: US 12,130,804 B2
(45) Date of Patent: Oct. 29, 2024

(54) TRACKING A RESUME POINT AND METRICS IN A COLLECTION OF OPERATIONS

(71) Applicant: HEWLETT PACKARD ENTERPRISE DEVELOPMENT LP, Spring, TX (US)

(72) Inventor: Zachary Nathan Turner, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/187,104

(22) Filed: Mar. 21, 2023

(65) Prior Publication Data
US 2024/0320209 A1 Sep. 26, 2024

(51) Int. Cl.
G06F 17/00 (2019.01)
G06F 11/14 (2006.01)
G06F 16/23 (2019.01)

(52) U.S. Cl.
CPC ...... *G06F 16/2379* (2019.01); *G06F 11/1469* (2013.01); *G06F 2201/84* (2013.01)

(58) Field of Classification Search
CPC ........ G06F 16/13; G06F 16/24; G06F 16/156; G06F 16/178; G06F 16/283; G06F 16/1402; G06N 3/00; G06N 5/00; G05B 13/00
See application file for complete search history.

(56) References Cited

U.S. PATENT DOCUMENTS

| 6,065,106 | A | * | 5/2000 | Deao | G06F 9/3853 |
| | | | | | 712/E9.043 |
| 7,024,206 | B2 | * | 4/2006 | Hamanaga | H04M 1/72403 |
| | | | | | 455/456.1 |
| 7,165,145 | B2 | | 1/2007 | Lam | |
| 8,331,808 | B2 | * | 12/2012 | Kaneda | G03G 15/6585 |
| | | | | | 399/18 |
| 8,488,153 | B2 | * | 7/2013 | Anezaki | G06F 3/1292 |
| | | | | | 358/1.15 |
| 8,572,317 | B2 | * | 10/2013 | Kim | G11B 27/105 |
| | | | | | 711/115 |
| 9,583,200 | B2 | * | 2/2017 | Nagadomi | G11C 16/0483 |

(Continued)

OTHER PUBLICATIONS

Wikipedia, "Acid," Oct. 31, 2022; 6 pages.
Wikipedia, "Consistency model," Nov. 7, 2022; 20 pages.

*Primary Examiner* — Hung D Le
(74) *Attorney, Agent, or Firm* — Trop, Pruner & Hu, P.C.

(57) ABSTRACT

In some examples, a system receives, as part of a service to update a data store, a collection of operations that are to be performed with respect to the data store, wherein the collection of operations comprises a plurality of different types of operations for respective data blocks of the data store. Multiple operations of a respective type of the different types of operations are batched to produce a batch of operations of the respective type, and the batch of operations of the respective type is flushed to the data store. The system progressively updates a tracking data structure that tracks batching and flushing of operations of the collection of operations during the service, where the tracking data structure includes metrics representing flushes of batches of operations of the different types. After an interruption of the service, the system resumes the service using a checkpointed version of a resume portion of the tracking data structure.

20 Claims, 11 Drawing Sheets

(56) References Cited

U.S. PATENT DOCUMENTS

| | | | |
|---|---|---|---|
| 9,613,064 B1 | 4/2017 | Chou et al. | |
| 9,740,522 B2* | 8/2017 | Schmidt | G06F 9/485 |
| 10,372,335 B2 | 8/2019 | Stabrawa et al. | |
| 10,521,135 B2 | 12/2019 | Kusters et al. | |
| 10,705,756 B2 | 7/2020 | Patwardhan et al. | |
| 10,942,623 B2* | 3/2021 | Kaneshiro | G06F 3/04817 |
| 11,010,064 B2 | 5/2021 | Kusters et al. | |
| 11,036,422 B2 | 6/2021 | Hutcheson et al. | |
| 11,061,713 B2 | 7/2021 | Hutcheson et al. | |
| 11,061,776 B2 | 7/2021 | Hutcheson et al. | |
| 11,687,366 B2* | 6/2023 | Vijay | G06F 9/321 |
| | | | 718/100 |
| 2004/0250294 A1* | 12/2004 | Kim | G11B 27/34 |
| | | | 725/135 |
| 2005/0132082 A1* | 6/2005 | Lee | G06F 8/60 |
| | | | 709/231 |
| 2008/0162666 A1* | 7/2008 | Ebihara | H04L 67/06 |
| | | | 709/217 |
| 2008/0187007 A1* | 8/2008 | Goyal | H04L 67/1095 |
| | | | 370/465 |
| 2009/0046577 A1* | 2/2009 | Marin | H04L 47/266 |
| | | | 370/219 |
| 2009/0204719 A1* | 8/2009 | Simongini | H04W 4/021 |
| | | | 709/231 |
| 2009/0262920 A1* | 10/2009 | Henrikson | H04L 65/1016 |
| | | | 379/221.09 |
| 2011/0091187 A1* | 4/2011 | Duffin | G11B 27/322 |
| | | | 386/343 |
| 2014/0281989 A1* | 9/2014 | Clark | G06F 3/0484 |
| | | | 715/717 |
| 2015/0378941 A1* | 12/2015 | Rozas | G06F 12/0806 |
| | | | 711/143 |
| 2018/0165298 A1 | 6/2018 | Koos et al. | |
| 2018/0300148 A1* | 10/2018 | Schuttenberg | G06F 9/3842 |
| 2019/0243647 A1* | 8/2019 | Anderson | G06F 9/30014 |
| 2020/0104221 A1* | 4/2020 | Kost | G11C 29/52 |
| 2021/0065701 A1* | 3/2021 | van Scheltinga | G10L 15/083 |
| 2021/0240520 A1* | 8/2021 | Upadhyay | G06F 11/1451 |
| 2021/0240574 A1* | 8/2021 | Upadhyay | G06F 16/162 |
| 2023/0101589 A1* | 3/2023 | Gualtieri | G06Q 10/063114 |
| | | | 705/7.26 |

* cited by examiner

TRACKING A RESUME POINT AND METRICS IN A COLLECTION OF OPERATIONS

BACKGROUND

Data stored in data stores can be copied to backup stores to protect against loss of data. A backup store is implemented using a collection of storage devices that is separate from storage devices of a data store. A backup control system can manage performance of data backups.

BRIEF DESCRIPTION OF THE DRAWINGS

Some implementations of the present disclosure are described with respect to the following figures.

Figure 1:
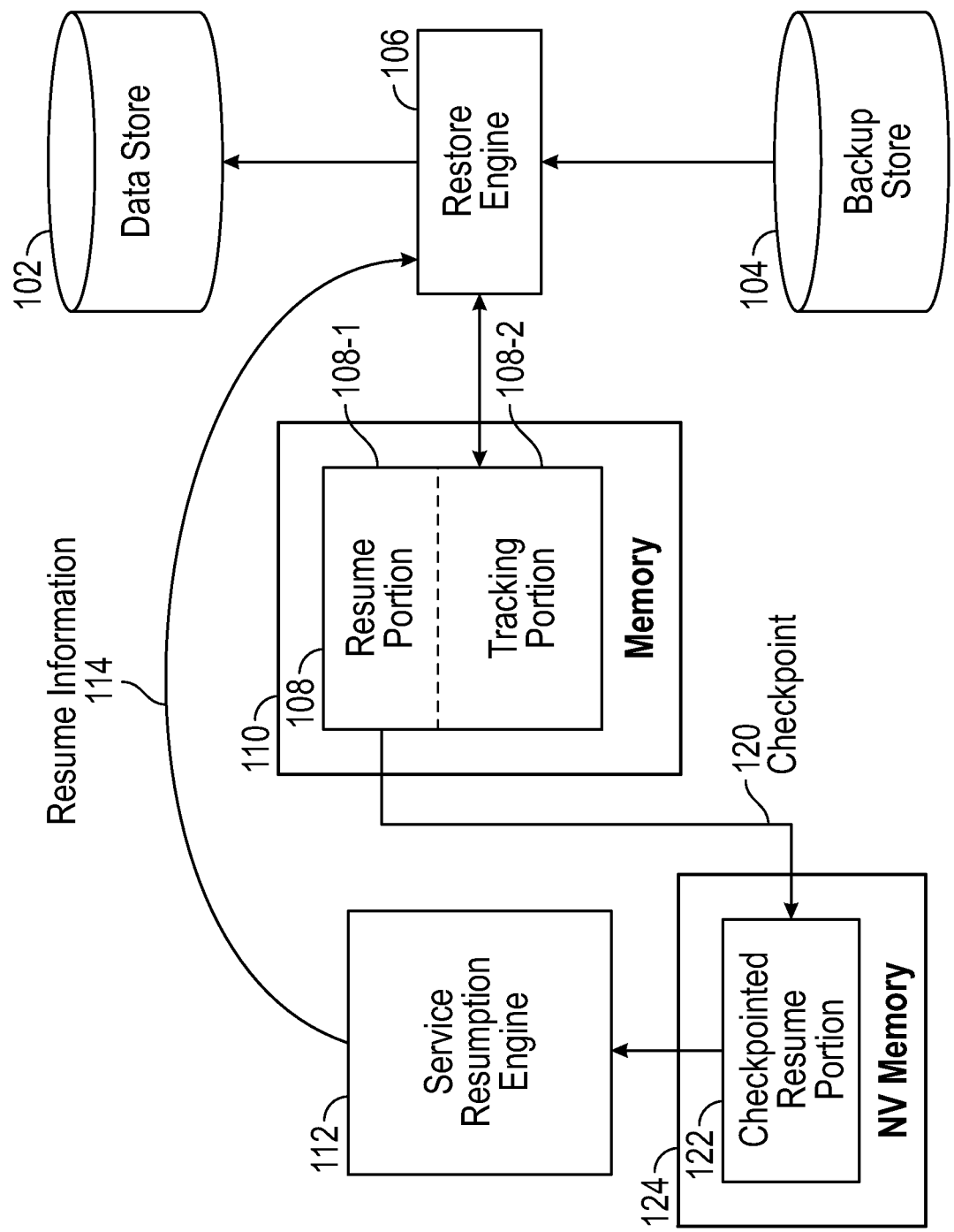
FIG. 1 is a block diagram of an arrangement that includes a restore engine and a service resumption engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A data service can be performed to update data at a data store. A "data store" refers to any storage structure to store data. The data store can refer to a logical data store, such as a storage volume. Alternatively, the data store can refer to a physical storage device or set of physical storage devices. The data store can be provided in a cloud, in a data center, on a storage farm, and so forth.

The data service can include a collection of operations that are to be performed for respective data blocks of the data store. A "data block" can refer to a unit of storage to store respective data. A data block can have a specified static size or a dynamically configurable size.

An example of a data service is a restore process that restores data from a backup store to a data store. A "backup store" refers to a data store that stores a copy of data in the data store. If the data store were to experience a data loss or error for any reason, the copy of the data in the backup store can be used to restore the data in the data store to a state prior to the data loss or error.

The collection of operations of the data service can include different types of operations that process data blocks in different ways. For example, a first type of operation can be a write operation that writes data in a data block of the data store. A second type of operation can be an unmap operation that is used to mark a data block as empty. An unmap operation is equivalent to a data delete operation to delete data in a data block. Although specific examples of different types of operations are noted above, in other examples, there may be other types of operations that can modify a value or status of a data block in a data store.

If a data service that includes a collection of operations were to be interrupted for some reason (e.g., loss of power, a computer crash, a program crash, etc.), it would be expensive in terms of resource usage if the data service had to be restarted from the beginning after the interruption. However, determining where to restart the data service (and resuming the tracking of metrics relating to the operations after the restart) can be challenging, particularly if the collection of operations of the data service include different types of operations that are interweaved with one another. Interweaving of operations of different types can refer to mixing the operations of the different types so that in any series of the operations, one or more operations of a first type may be provided between operations of a second type, and vice versa.

Metrics relating to the operations of different types of the data service are used by an entity (e.g., a cloud entity, a server, etc.) performing the data service to confirm that the data service was successfully performed. For example, the entity can compute a checksum or another verification value based on the metrics, where the checksum or another verification value is used by the entity to confirm successful completion of the data service. Thus, when resuming the data service from a resume point, values of metrics relating to the operations as of the resume point are to be provided to ensure that the data service can resume the tracking of the metrics as the data service is performed.

Determining where to restart the data service and providing metrics relating to the operations of the data service can further be complicated if the data service flushes batches of operations to the data store (rather than flushes operations individually as they are encountered). For example, the data service can batch multiple operations of the first type, batch multiple operations of the second type, and so forth, and as the multiple operations of a given type are batched, the batched operations of the given type are flushed to the data store. Flushing an operation to a data store refers to performing the operation with respect to the data store such that the data store is modified by the operation and a result of the operation is persisted.

In accordance with some implementations of the present disclosure, a tracking data structure is used to track batching and flushing of operations of a collection of operations (e.g., interweaved stream of operations of different types) during a data service. The tracking data structure is progressively updated as operations of the collection of operations of the data service are performed. The data service flushes operations to a data store in batches of different types of operations, and the data service provides a count of the number of operations of each type that have been flushed to the data store. Anytime a sufficient size batch of any type of operation is reached, a flush of that operation type is performed. As the data service proceeds, the data service takes a snapshot of a new point in the collection of operations from which the data service can resume (if there is a failure). The snapshot is in the form of a checkpointed portion of the tracking data structure, where the checkpointed portion includes: (1) an index representing the resume point in the collection of operations from which the data service can resume after an interruption of the data service, and (2) operation type metrics (including counts of operations of each type that have been flushed) as of that resume point. If a data service resumption (after failure of the data service) is to be performed, an entity that is responsible for resuming the data service is able to retrieve the checkpointed portion of the tracking data structure (the index representing the resume point and corresponding metrics), and the entity resumes the data service using the index and the metrics. "Checkpointing" a portion the tracking data structure can refer to outputting the portion of the tracking data structure to another entity so that the data service may be resumed based on the output portion of the tracking data structure. As an example, checkpointing a portion of the tracking data structure may refer to saving the portion of the tracking data structure to a nonvolatile memory so that the saved portion of the tracking data structure can later be retrieved to use for resuming the data service.

FIG. 1 is a block diagram of an example arrangement that includes a data store 102 to store data. The data store 102 can be implemented using a collection of storage devices (a single storage device or multiple storage devices). Examples of storage devices can include any or some combination of disk-based storage devices, solid state drives, and so forth. The data store 102 may be provided in a cloud, in a data center, in a storage form, and so forth.

To protect data stored in the data store 102, a backup copy of the data can be stored in the backup store 104. The backup store 104 can be implemented using a collection of storage devices, which can be separate from the collection of source devices used to implement the data store 102. Data from the data store 102 can be backed up to the backup store 104 at periodic intervals or in response to certain events.

If data at the data store 102 becomes unavailable for any reason (e.g., due to a fault or failure of the data store 102, due to data corruption, etc.), a restore service can be performed to restore data from the backup store 104 to the data store 102. The restore service is performed by a restore engine 106. The restore service restores data in the data store 102 to a last known good version of the data that was backed up to the backup store 104.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The restore service performed by the restore engine 106 is an example of a data service that can be performed with respect to the data store 102. In other examples, other types of data services can be performed in which updates are performed of data in the data store 102.

As part of the restore service, the restore engine 106 can update information elements in a tracking data structure 108. In some examples, the tracking data structure 108 is stored in a memory 110. The memory 110 can be implemented using a collection of memory devices (a single memory device or multiple memory devices). Examples of memory devices can include any or some combination of dynamic random access memory (DRAM) devices, static random access memory (SRAM) devices, flash memory devices, and so forth. In an example, if the restore engine 106 is implemented in a computer system, the memory 110 may be part of the computer system.

A "tracking data structure" can refer to one or more containers of data, such as file(s), log(s), and so forth. The information elements in the tracking data structure 108 can include (1) an index representing a resume point from which the restore service can be resumed in case of interruption of the restore service, and (2) various metrics relating to operations of the restore service. The "resume point" refers to a data block subject to a modification operation (e.g., a write operation or unmap operation) from which the restore service can be resumed. Details of example metrics that can be included in the tracking data structure 108 are discussed further below.

The tracking data structure 108 includes a resume portion 108-1 and a tracking portion 108-2. The resume portion 108-1 of the tracking data structure 108 is the portion that can be checkpointed (120) to a nonvolatile memory 124 in response to each occurrence of a specified event. The checkpointed resume portion stored in the nonvolatile memory 124 is represented as 122 in FIG. 1. In some examples, the resume portion 108-1 can be checkpointed (120) to the nonvolatile memory 124 in response to any or some combination of the following events: (1) a certain amount of data has been processed (e.g., a specified size of data has been processed or a specified quantity of data blocks has been processed), or (2) an index representing a resume point is updated in the resume portion 108-1, or (3) any other event. As the resume portion 108-1 is updated during the restore service, further checkpoints of the resume portion 108-1 are saved to the nonvolatile memory 124. Note that the checkpointed resume portion 122 refers to the latest checkpoint of the resume portion 108-1.

Although reference is made to checkpointing the resume portion 108-1 by saving it to the nonvolatile memory 124 in the example of FIG. 1, in other examples, checkpointing the resume portion 108-1 can refer to outputting the resume portion 108-1 to another entity (such as a service resumption engine 112) so that the resume portion 108-1 is available for use by the other entity in resuming the restore service (or causing the restore service to be resumed).

The resume portion 108-1 can include the index representing the resume point and operation type metrics representing different types of operations that have been flushed up to the resume point represented by the index. The tracking portion 108-2 of the tracking data structure 108 can include tracking metrics, including metrics relating to a quantity of data blocks that have been encountered, a quantity of data blocks that have been processed, a quantity of data blocks subject to the different types of operations that have been flushed, and so forth. Details of the metrics in the resume portion 108-1 and the tracking portion 108-2 are discussed further below. In some examples of the present disclosure, the checkpointing (120) persists the resume portion 108-1 but not the tracking portion 108-2 to the nonvolatile memory 124 (the resume portion 108-1 is checkpointed but the tracking portion 108-2 is not checkpointed).

The nonvolatile memory 124 can be implemented with any or some combination of nonvolatile memory devices such as flash memory devices or persistent storage devices such as disk-based storage devices or solid state drives. The nonvolatile memory 124 is accessible by the service resumption engine 112.

In case of an interruption of a restore service, the service resumption engine 112 can be used to manage the resumption of the restore service. The restore service may be interrupted due to any of various reasons, including a fault or failure of the restore engine 106, a fault or failure of a communication link to the backup store 104 and/or the data store 102, an uncorrectable data error, and so forth.

The service resumption engine 112 is able to access the checkpointed resume portion 122 to determine the resume point and to determine current values of operation type metrics for the resume point. The service resumption engine 112 can output resume information 114 to the restore engine 106, where the resume information 114 can include information of the resume point and current values of the operation type metrics to be used by the restore engine 106 when resuming the restore service. When resuming the restore service from the checkpointed resume portion 122, the tracking metrics in the tracking portion 108-2 can be initialized to zero and the tracking metrics in the tracking portion 108-2 can be updated as further data blocks are processed by the restore engine 106 when resuming from the resume point.

Although FIG. 1 shows the service resumption engine 112 as being separate from the restore engine 106, it is noted that in other examples, the service resumption engine 112 can be part of the restore engine 106.

Figure 2:
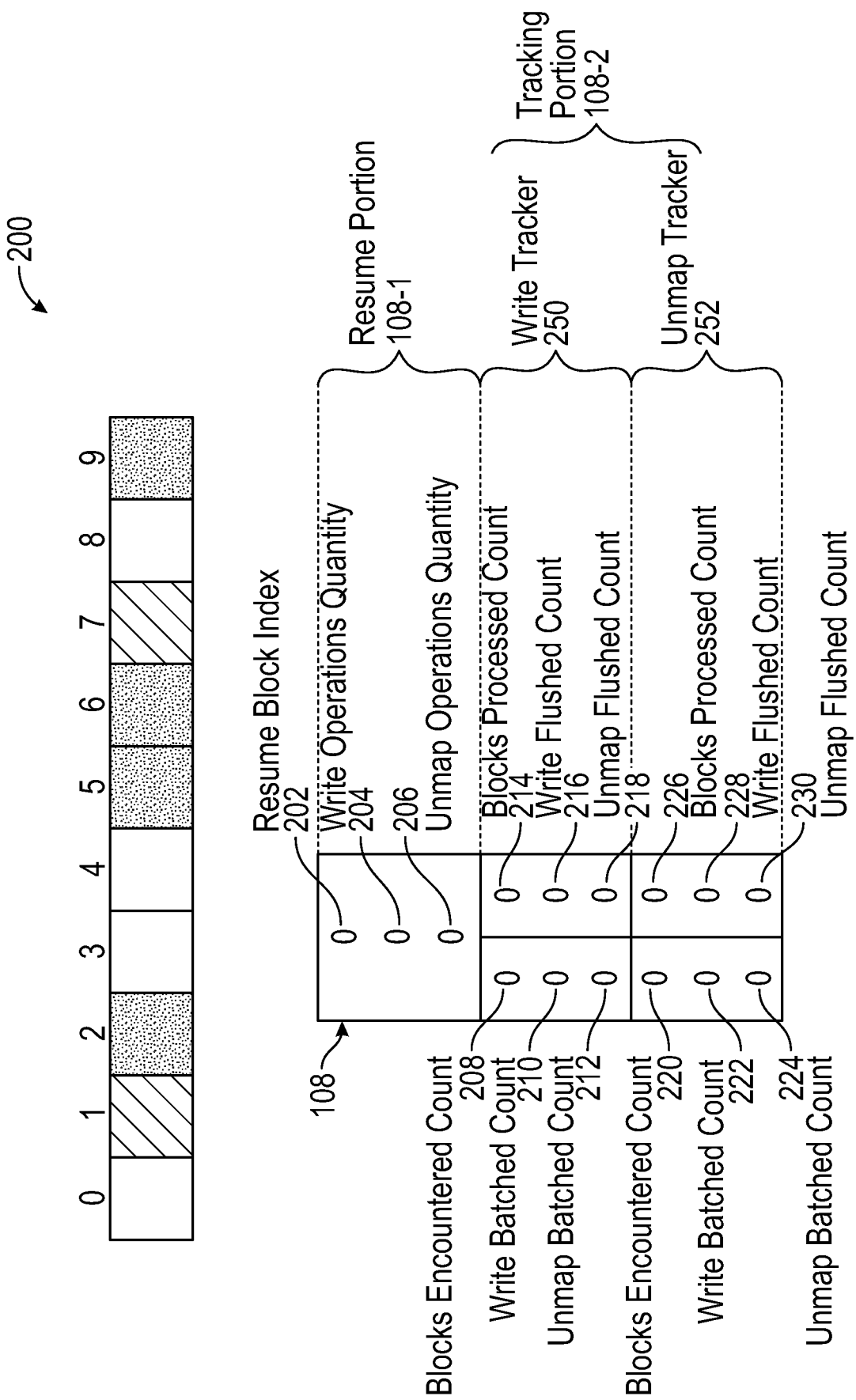
FIG. 2 is a block diagram of a tracking data structure according to some examples.

An example of the tracking data structure 108 is depicted in FIG. 2. In other examples, the tracking data structure 108 can have other forms and can include different information elements.

The resume portion 108-1 of the tracking data structure 108 includes a resume block index 202, which represents a data block in a stream of data blocks 200 from which the service resumption engine 112 can resume the restore service in case of interruption of the restore service. Each rectangular box in the stream 200 represents a data block. Unshaded boxes (e.g., data blocks 0, 3, 4, and 8) in the stream 200 represent data blocks not subject to any modification operation (e.g., not subject to a write operation or an unmap operation). Boxes in the stream 200 that have a first shade pattern (e.g., data blocks 1, 7) represent data blocks subject to write operations. Boxes in the stream 200 that have a second shade pattern (e.g., data blocks 2, 5, 6, and 9) represent data blocks subject to unmap operations.

In some examples, the resume block index 202 is a block number that identifies the data block in the stream 200 from which the restore service can resume. In other examples, the resume block index 202 is a value that is used to derive the block number that identifies the data block in the stream 200 from which the restore service can resume.

The resume portion 108-1 of the tracking data structure 108 further includes a count 204 of the quantity of write operations that have been processed up to the resume point represented by the resume block index 202, and a count 206 of the quantity of unmap operations that have been processed up to the resume point represented by the resume block index 202. A write or unmap operation is "processed" if the data block that is the subject of the write or unmap operation is flushed to the data store 102. Flushing a data block that is the subject of the write or unmap operation to the data store 102 refers to persisting a result of the write or unmap operation to the data block in the data store 102. More generally, flushing a data block refers to persisting a result of any modification of the data block in the data store 102.

Although some examples discussed herein refer to metrics for write operations and metrics for unmap operations, note that more generally, the tracking data structure 108 can include metrics relating to more than two types of operations.

The counts 204 and 206 are examples of operation type metrics that are tracked by the restore service as data blocks are restored from the backup store 104 to the data store 102. The counts 204 and 206 are retrieved along with the resume block index 202 when resuming the restore service after an interruption of the restore service. The resume block index 202 indicates to the restore engine 106 which data block the restore service can resume from, and the counts 204 and 206 are used by the restore engine 106 as a starting point from which the counts 204 and 206 are tracked as the restore service is resumed.

The tracking portion 108-2 of the tracking data structure 108 includes a write tracker 250 and an unmap tracker 252. Each of the write tracker 250 and the unmap tracker 252 includes tracking metrics that are used to update the resume block index 202 and the counts 204 and 206.

The write tracker 250 includes a blocks encountered count 208 that represents the quantity of data blocks in the stream 200 that have been encountered (or received) by the restore service. A data block that is "encountered" or "received" has not yet been flushed to the data store 102. The write tracker 250 further includes: a write batched count 210 that represents the quantity of data blocks subject to write operations that have been encountered in the stream 200 (these data blocks subject to the write operations can be batched together to flush as a batch); and an unmap batched count 212 that represents the quantity of data blocks subject to unmap operations that have been encountered in the stream 200 (these data blocks subject to the unmap operations can be batched together to flush as a batch).

The write tracker 250 further includes a blocks processed count 214 that represents the quantity of data blocks that have been processed. A data block is "processed" if the data block (as modified by any operation applied to the data block) is persisted to the data store 102 as part of the restore service. Note that some of the data blocks in the stream 200 are not subject to any modification operation (e.g., a write operation or unmap operation) and thus such data blocks are considered to be persisted (flushed) when they are encountered (i.e., the restore service does not have to modify the data store 102 since no modification operation is associated with each such data block).

The write tracker 250 further includes a write flushed count 216 that represents the quantity of data blocks subject to write operations that have been flushed (as a batch), and an unmap flushed count 218 that represents the quantity of data blocks subject to unmap operations that have been flushed (as a batch).

The unmap tracker 252 includes similar metrics, including a blocks encountered count 220 that represents the quantity of data blocks in the stream 200 that have been encountered (or received) by the restore service; a write batched count 222 that represents the quantity of data blocks subject to write operations that have been encountered in the stream 200; an unmap batched count 224 that represents the quantity of data blocks subject to unmap operations that have been encountered in the stream 200; a blocks processed count 226 that represents the quantity of data blocks that have been processed; a write flushed count 228 that represents the quantity of data blocks subject to write operations that have been flushed (as a batch), and an unmap flushed count 230 that represents the quantity of data blocks subject to unmap operations that have been flushed (as a batch).

The reason that similar metrics are tracked by the write tracker 250 and the unmap tracker 252 will become apparent in a discussion of examples below and in connection with FIGS. 3A-3O. At the beginning of the stream 200, it is assumed that the values of all of the metrics in the tracking data structure 108 is initialized to zero.

Figure 3A:
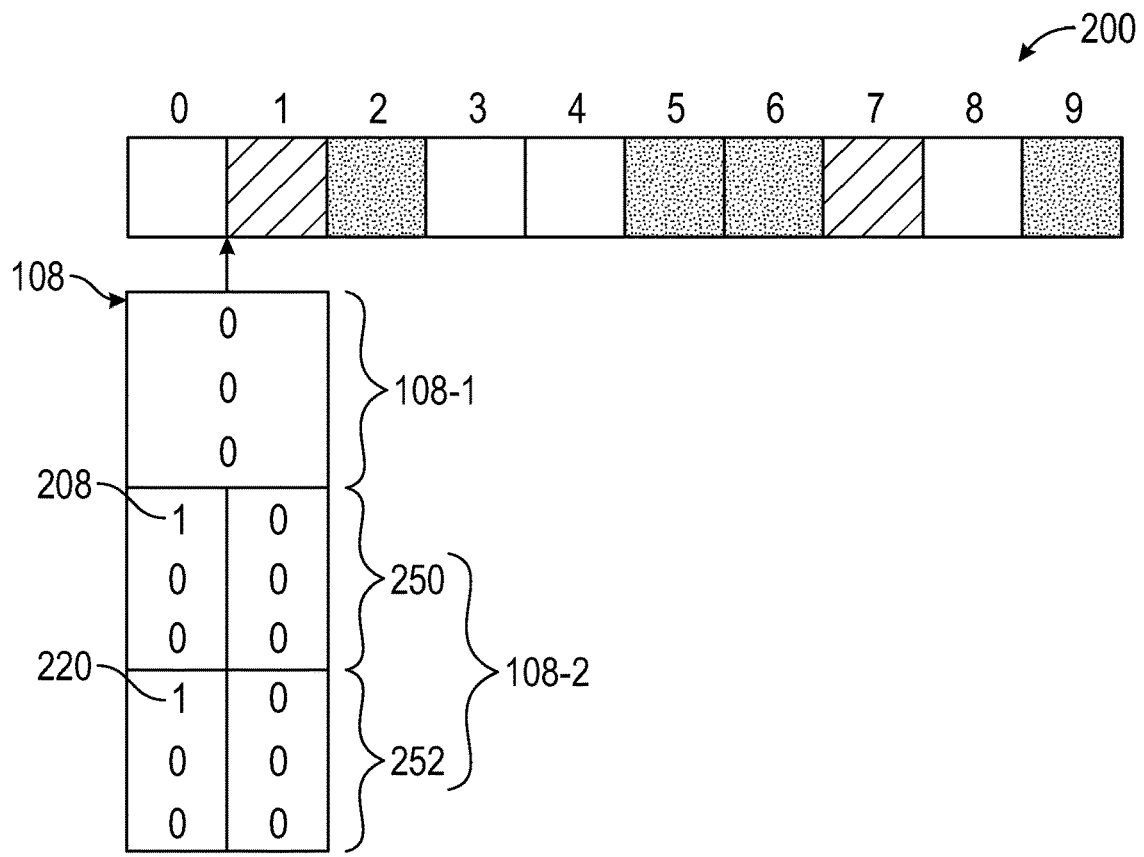
FIGS. 3A-3O illustrate examples of updating a tracking data structure, according to some examples.

FIG. 3A shows the content of the tracking data structure 108 after the restore service has encountered data block 0.

The restore service increments the blocks encountered count 208 (to the value 1) in the write tracker 250, and increments the blocks encountered count 220 (to the value 1) in the unmap tracker 252. Since data block 0 is not subject to a write operation or an unmap operation, none of the other counts in the write tracker 250 and the unmap tracker 252 are updated.

Although reference is made to incrementing counts or other metrics in some examples, it is noted that counts or other metrics can be decremented from a larger starting value.

Figure 3B:
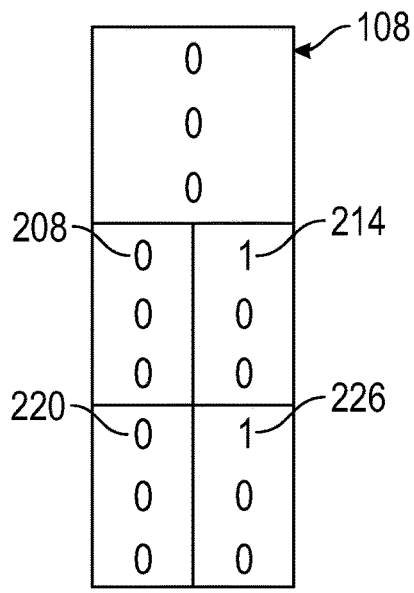

Since at this time there are no batched data blocks subject to a write operation or an unmap operation, the restore service increments the blocks processed count 214 (to the value 1) in the write tracker 250 (while decrementing the blocks encountered count 208 to 0), and increments the blocks processed count 226 (to the value 1) in the unmap tracker 252 (while decrementing the blocks encountered count 220 to 0), as shown in FIG. 3B.

Figure 3C:
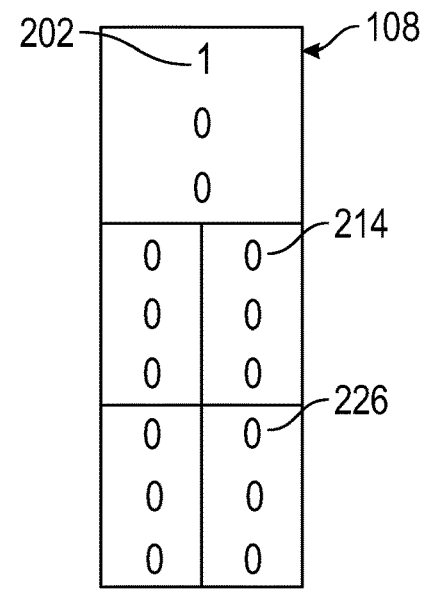

As shown in FIG. 3C, the restore service adds the minimum value of the blocks processed count 214 in the write tracker 250 and the blocks processed count 226 in the unmap tracker 252 to the resume block index 202. Note that the blocks processed count 214 and the blocks processed count 226 both have the value 1, so 1 is the minimum value that is added to the resume block index 202, which is set equal to 1 as shown in FIG. 3C. The restore service also subtracts the minimum value added to the resume block index 202 from the blocks processed count 214 in the write tracker 250 and the blocks processed count 226 in the unmap tracker 252 (which are both set to 0 as shown in FIG. 3C).

FIG. 3C thus indicates that the restore service can safely be resumed starting at data block 1.

Figure 3D:
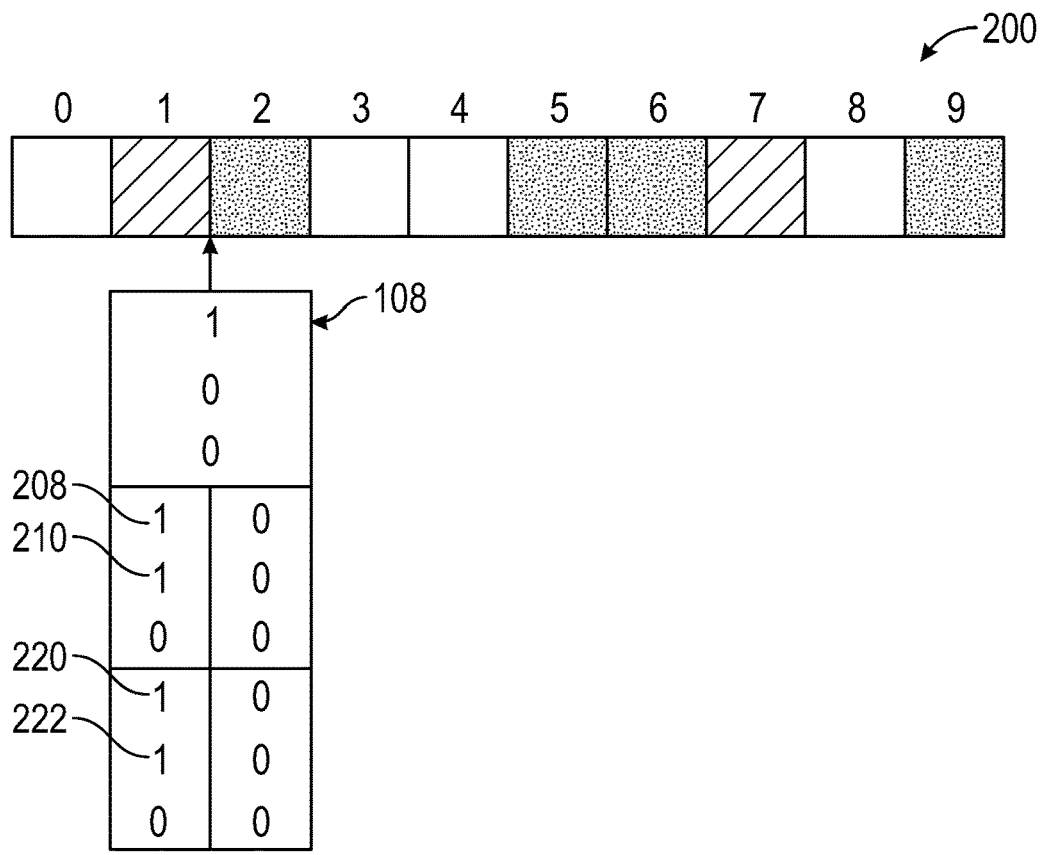

FIG. 3D shows the content of the tracking data structure 108 after the restore service has encountered block 1 in the stream 200. Block 1 is subject to a write operation. The restore service increments the blocks encountered count 208 (to the value 1) in the write tracker 250, and increments the blocks encountered count 220 (to the value 1) in the unmap tracker 252. In addition, the restore service increments the write batched count 210 (to the value 1) in the write tracker 250, and increments the write batched count 222 (to the value 1) in the unmap tracker 252. Incrementing the write batched count (210 or 222) to the value 1 indicates that one data block subject to a write operation is in a batch of write operations.

Figure 3E:
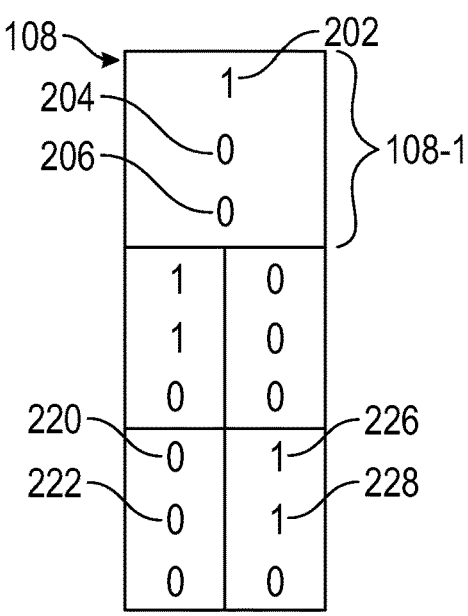

As shown in FIG. 3E, since there are no batched data blocks subject to unmap operations, the restore service increments the blocks processed count 214 in the unmap tracker 252 to the value 1, while decrementing the blocks encountered count 220 to 0. The restore service also increments the write flushed count 228 in the unmap tracker 252 to the value 1, while decrementing the write batched count 222 in the unmap tracker 252 to 0.

Note that since the write batched count 210 in the write tracker 250 is greater than 0 but less than a flush threshold (e.g., 2 or another value), the write tracker 250 remains unchanged in FIG. 3E. The flush threshold refers to a quantity of modification operations (write operations or unmap operations) that is to be flushed together as a batch. Note that the flush thresholds for different types of modification operations can be the same or different. Thus, if the flush threshold is equal to 2, then two batched modification operations can be flushed together. In further examples, flushing modification operations can be performed for other reasons, such as due to having traversed a large amount of storage space since a last flush.

Figure 3F:
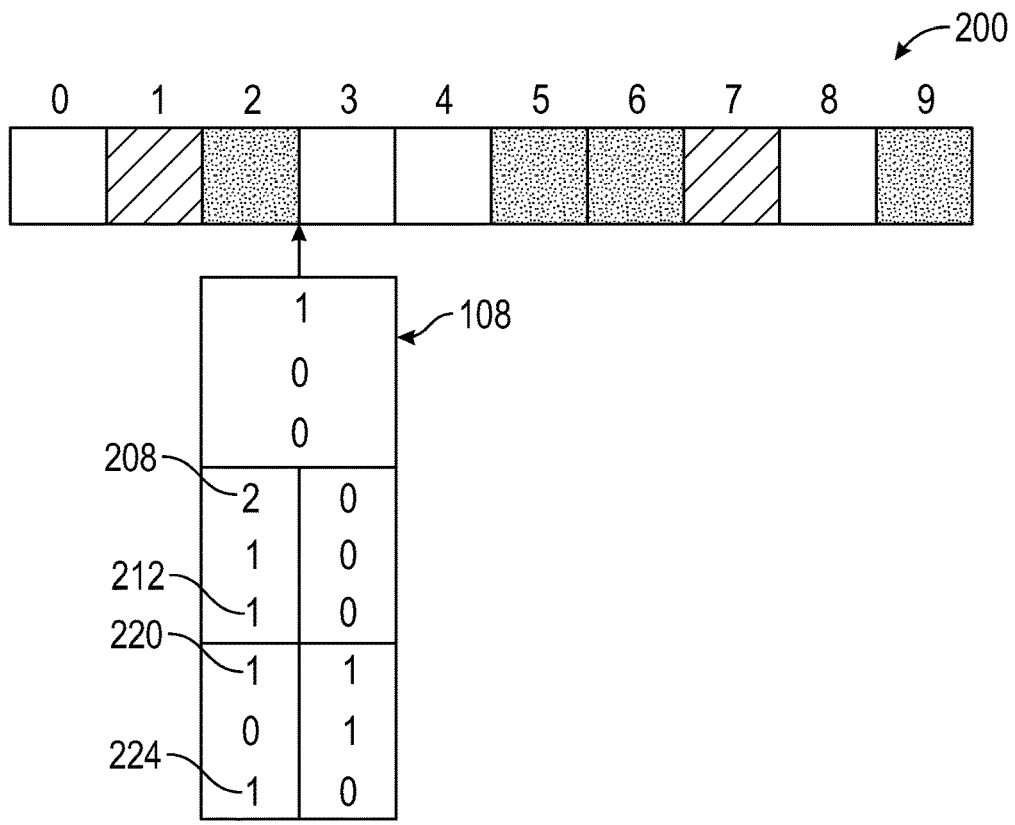

FIG. 3F shows the content of the tracking data structure 108 after the restore service has encountered data block 2 in the stream 200. Data block 2 is subject to an unmap operation. The restore service increments the blocks encountered count 208 (to the value 2) in the write tracker 250, and increments the blocks encountered count 220 (to the value 1) in the unmap tracker 252. In addition, the restore service increments the unmap batched count 212 (to the value 1) in the write tracker 250, and increments the unmap batched count 224 (to the value 1) in the unmap tracker 252. Incrementing the unmap batched count (212 or 224) to the value 1 indicates that one data block subject to an unmap operation is in a batch of unmap operations.

At this time, since the write batched count 210 in the write tracker 250 is greater than 0 but less than the flush threshold, the write tracker 250 remains unchanged from the state of FIG. 3F, and similarly, since the unmap batched count 224 in the unmap tracker 252 is greater than 0 but less than the flush threshold, the unmap tracker 252 remains unchanged from the state of FIG. 3F.

Figure 3G:
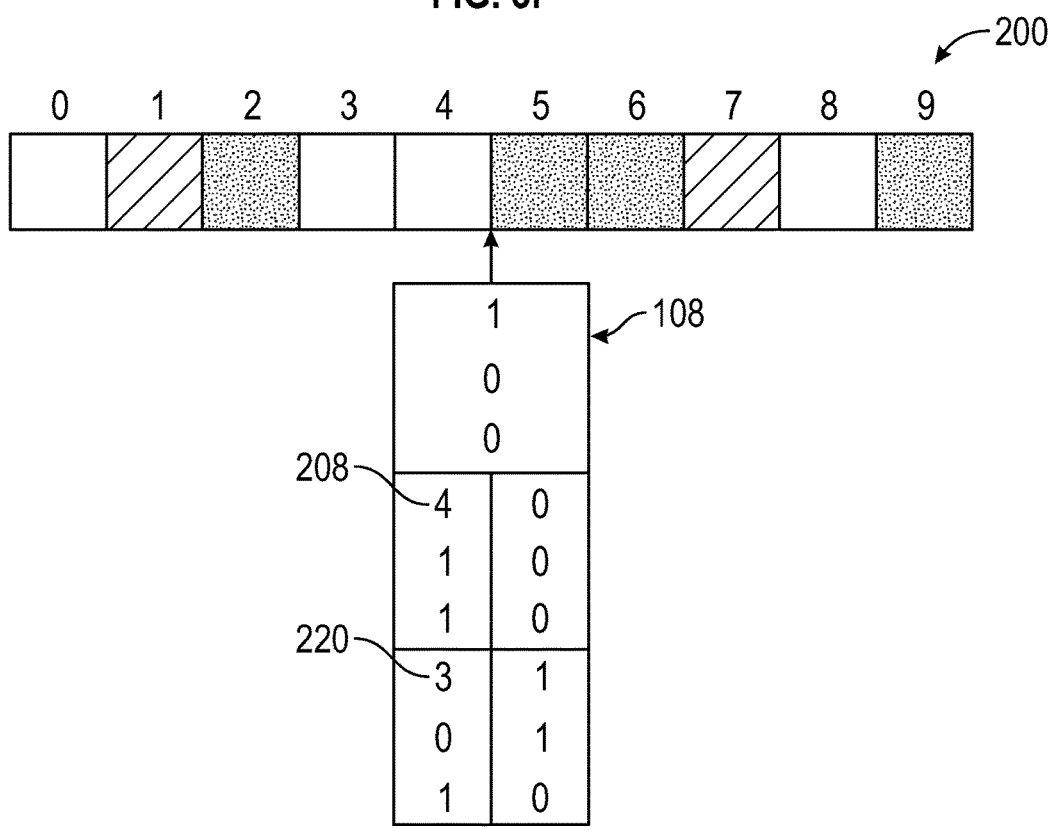

FIG. 3G shows the content of the tracking data structure 108 after the restore service has encountered data blocks 3 and 4 in the stream 200. Data blocks 3 and 4 are not subject to any modification operation. As a result, the restore service increments (by 2 due to encountering two data blocks) the blocks encountered count 208 (to the value 4) in the write tracker 250, and increments (by 2) the blocks encountered count 220 (to the value 3) in the unmap tracker 252.

Figure 3H:
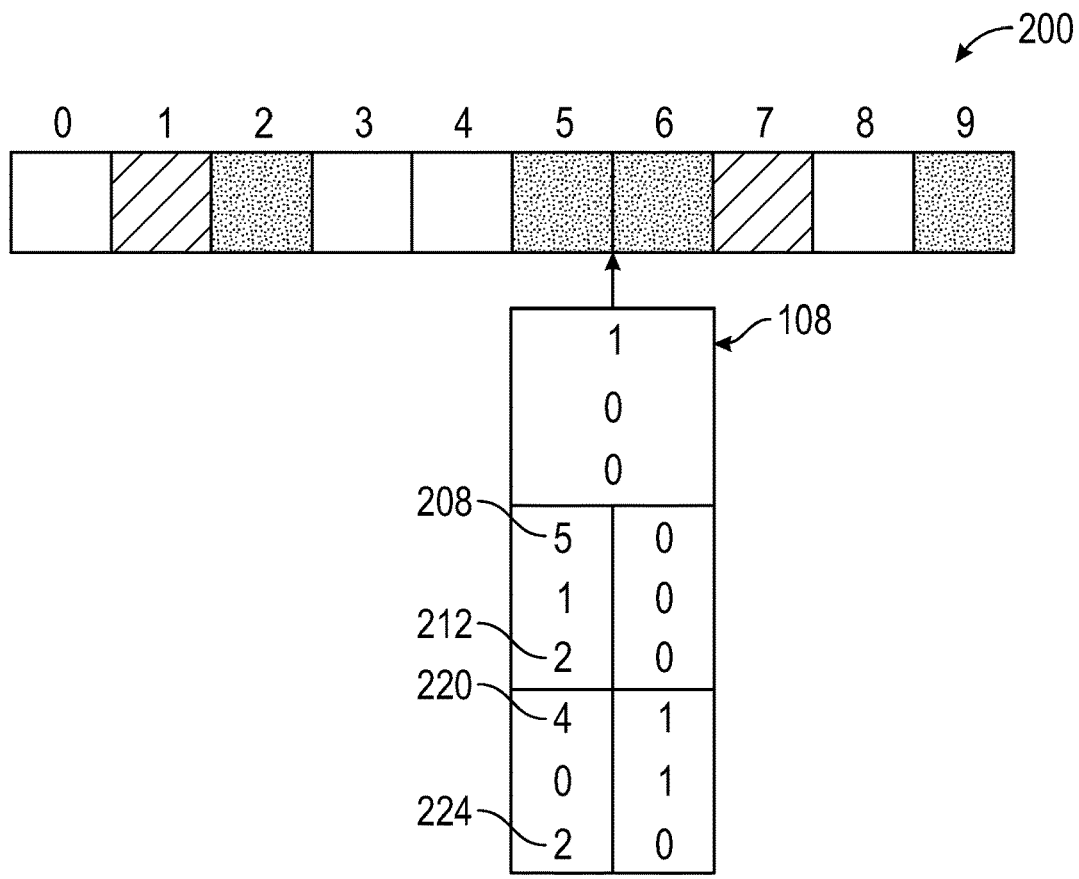

FIG. 3H shows the content of the tracking data structure 108 after the restore service has encountered data block 5 in the stream 200. Data block 5 is subject to an unmap operation. The restore service increments the blocks encountered count 208 (to the value 5) in the write tracker 250, and increments the blocks encountered count 220 (to the value 4) in the unmap tracker 252. In addition, the restore service increments the unmap batched count 212 (to the value 2) in the write tracker 250, and increments the unmap batched count 224 (to the value 2) in the unmap tracker 252. Incrementing the unmap batched count (212 or 224) to the value 2 indicates that two data blocks subject to unmap operations are in a batch of unmap operations.

Figures 3I, 3J:
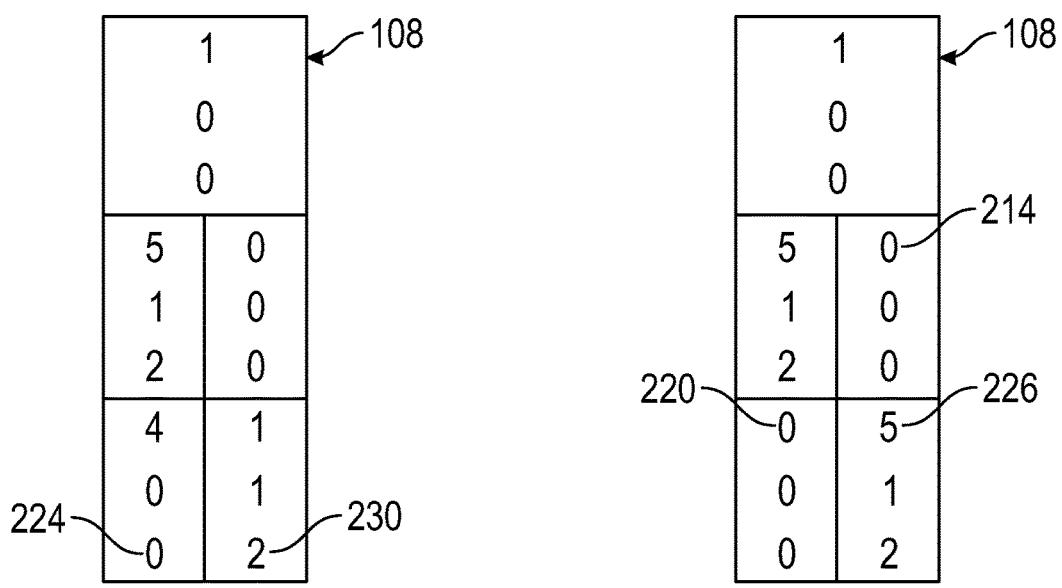

At this time, the unmap batched count 224 in the unmap tracker 252 is equal to the flush threshold, so that the batch of data blocks 2 and 5 subject to unmap operations can be flushed. As shown in FIG. 3I, as a result of flushing the data blocks 2 and 5, the restore service increments (by 2) the unmap flushed count 230 in the unmap tracker 252 to the value 2, and decrements (by 2) the unmap batched count 224 in the unmap tracker 252 to 0.

At this time, since the write batched count 210 in the write tracker 250 is greater than 0 but less than the flush threshold, the write tracker 250 remains unchanged from the state of FIG. 3H.

The unmap tracker 252 in FIG. 3I indicates that there are no longer any batched data blocks subject to unmap operations. As a result, as shown in FIG. 3J, the restore service increments the blocks processed count 226 by the value (4) of the blocks encountered count 220 to the value 5, and decrements (by 4) the blocks encountered count 220 in the unmap tracker 252 to 0.

In the state of the tracking data structure 108 shown in FIG. 3J, the minimum value of the blocks processed count 214 in the write tracker 250 and the blocks processed count 226 in the unmap tracker 252 is 0, so the resume block index 202 remains unchanged. In other words, the resume point cannot be advanced even though data blocks 2 and 6 have been flushed. The resume point cannot be advanced because data block 1 subject to a write operation has not been flushed (as indicated by the write batched count 210 in the write tracker 250 being greater than 0).

Figure 3K:
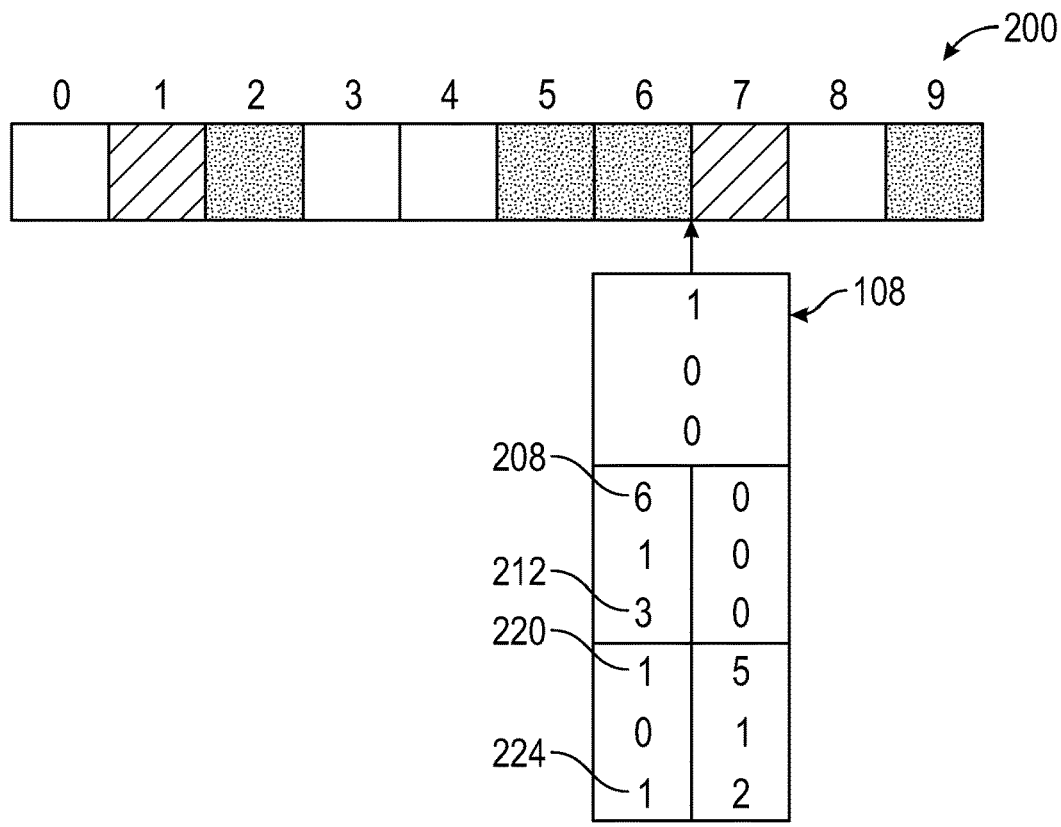

FIG. 3K shows the content of the tracking data structure 108 after the restore service has encountered data block 6 in the stream 200. Data block 6 is subject to an unmap operation. The restore service increments the blocks encountered count 208 (to the value 6) in the write tracker 250, and increments the blocks encountered count 220 (to the value 1) in the unmap tracker 252. In addition, the restore service increments the unmap batched count 212 (to the value 3) in the write tracker 250 and increments the unmap batched count 224 (to the value 1) in the unmap tracker 252.

Figure 3L:
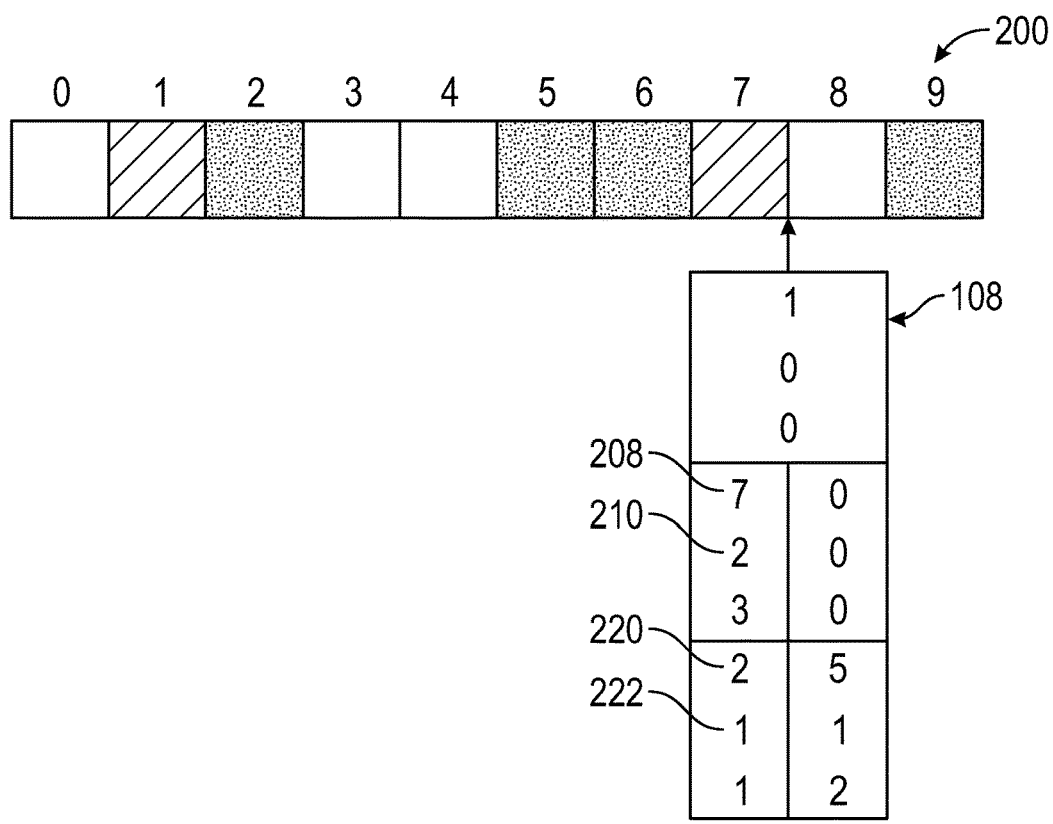

FIG. 3L shows the content of the tracking data structure 108 after the restore service has encountered data block 7 in the stream 200. Data block 7 is subject to a write operation. The restore service increments the blocks encountered count 208 (to the value 7) in the write tracker 250, and increments the blocks encountered count 220 (to the value 2) in the unmap tracker 252. In addition, the restore service increments the write batched count 210 (to the value 2) in the write tracker 250, and increments the write batched count 222 (to the value 1) in the unmap tracker 252.

At this time, the write batched count 210 in the write tracker 250 is equal to the flush threshold, so that the batch of data blocks 1 and 7 subject to write operations can be flushed. As shown in FIG. 3M, as a result of flushing the data blocks 1 and 7, the restore service increments (by 2) the write flushed count 216 in the write tracker 250 to the value 2, and decrements (by 2) the write batched count 210 in the write tracker 250 to 0.

At this time, since the unmap batched count 224 in the unmap tracker 252 is greater than 0 but less than the flush threshold, the unmap tracker 252 remains unchanged from the state of FIG. 3L.

Figures 3M, 3N, 3O:
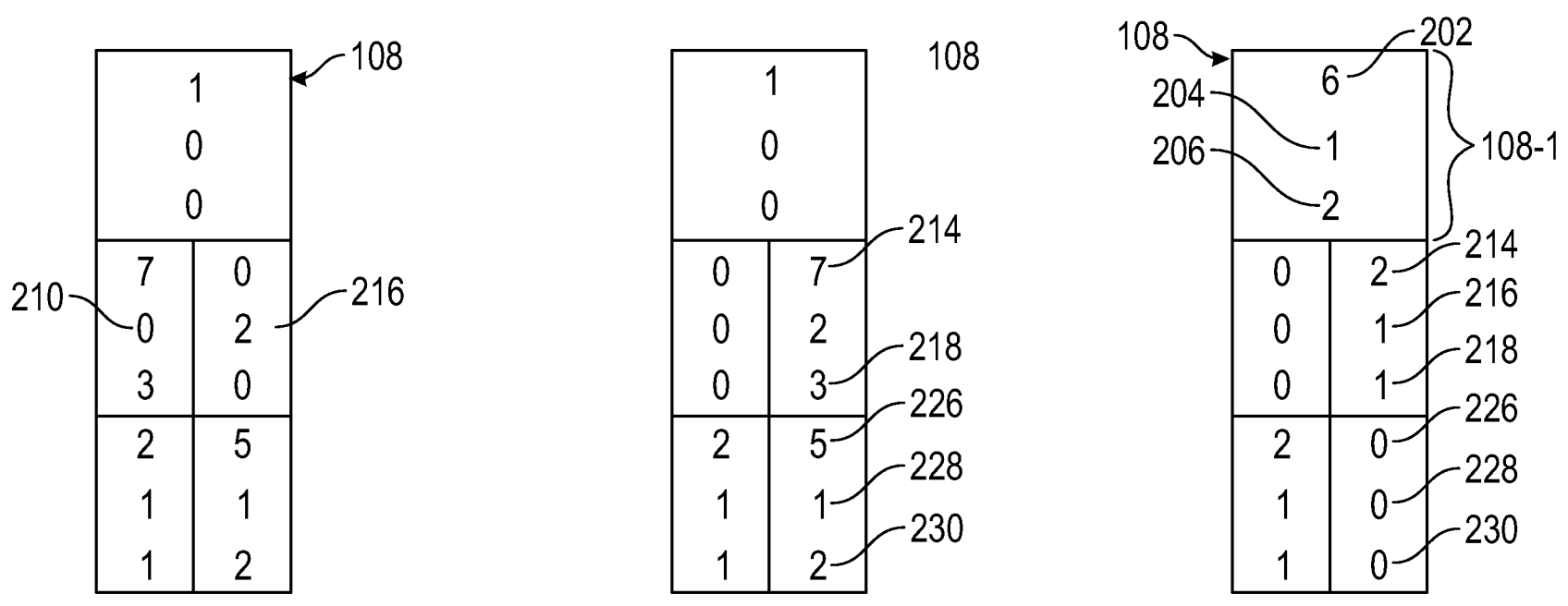

The write tracker 250 in FIG. 3M indicates that there are no longer any batched data blocks subject to write operations. As a result, as shown in FIG. 3N, the restore service increments the blocks processed count 214 by the value (7) of the blocks encountered count 208 to the value 7, and decrements (by 7) the blocks encountered count 208 in the write tracker 250 to 0.

In the state of the tracking data structure 108 shown in FIG. 3N, the minimum value of the blocks processed count 214 in the write tracker 250 and the blocks processed count 226 in the unmap tracker 252 is 5. As shown in FIG. 3O, the restore service increments the resume block index 202 by the value 5 (which is the value of the blocks processed count 226 in the unmap tracker 252). In FIG. 3O, the resume block index 202 has been updated to the value 6, which indicates that a resume of the restore service can safely start at data block 6.

The restore service also increments the count 204 of the quantity of write operations by the value of the write flushed count 228 in the unmap tracker 252, while decrementing the write flushed count 228 to 0. The restore service also increments the count 206 of the quantity of unmap operations by the value of the unmap flushed count 230 in the unmap tracker 252, while decrementing the unmap flushed count 230 to 0. The count 204 represents the quantity of write operations that have been processed up to the resume point represented by the resume block index 202 (which is data block 6 in FIG. 3O), and the count 206 represents the quantity of unmap operations that have been processed up to the resume point represented by the resume block index 202 (which is data block 6 in FIG. 3O).

Similar further updates of the tracking data structure 108 can be performed by the restore service as additional data blocks of the stream 200 are encountered.

As noted above, the resume portion 108-1 of the tracking data structure 108 can be checkpointed to the nonvolatile memory 124 (FIG. 1). The checkpointed resume portion 122 (FIG. 1) can be used to identify a resume point in the stream of data blocks 200, and to obtain updated metrics that can be used as a starting point for the operation type metrics when resuming the restore service in response to an interruption of the restore service. As an example, the resume portion 108-1 of the tracking data structure 108 having the state shown in FIG. 3G may be checkpointed. The write tracker 250 and the unmap tracker 252 of the tracking data structure 108 are not checkpointed.

It is assumed that after checkpointing the resume portion 108-1 of the tracking data structure 108 having the state shown in FIG. 3G, the restore service is interrupted. At this time, the restore service has processed data block 4. When resuming the restore service using the checkpointed version of the resume portion 108-1 of FIG. 3G, the restore service would resume from data block 1 (resume block index 202 has value 1) using the counts 204 and 206 with value 0 as the value for each of the operation type metrics at the resume point, meaning that the quantity of write operations that have been processed (or flushed) up to the resume point of data block 1 is 0 and the quantity of unmap operations that have been processed (or flushed) up to the resume point of data block 1 is 0.

When resuming from data block 1, the metrics in the write tracker 250 and the unmap tracker 252 are initialized to 0 and updated as additional data blocks are encountered and processed starting at data block 1. The counts 204 and 206 both set at value 0 in the checkpointed version of the resume portion 108-1 of FIG. 3E are used as initial values in resuming the restore service. The counts 204 and 206 are updated from these initial values as the metrics in the write tracker 250 and the unmap tracker 252 are updated, as discussed above.

As another example, the resume portion 108-1 of the tracking data structure 108 having the state shown in FIG. 3O may be checkpointed. The write tracker 250 and the unmap tracker 252 of the tracking data structure 108 are not checkpointed. When resuming the restore service using the checkpointed version of the resume portion 108-1 of FIG. 3O, the restore service would resume from data block 6 (resume block index 202 has value 6) using the count 204 with value 1 and the count 206 with value 2 (which means that the quantity of write operations that have been processed up to the resume point of data block 6 is 1, and the quantity of unmap operations that have been processed up to the resume point of data block 6 is 2). When resuming from data block 6, the metrics in the write tracker 250 and the unmap tracker 252 are initialized to 0 and updated as additional data blocks are encountered and processed starting at data block 6. The count 204 starting at value 1 and the count 206 starting at value 2 are used as initial values in resuming the restore service. The counts 204 and 206 are updated from these initial values as the metrics in the write tracker 250 and the unmap tracker 252 are updated, as discussed above.

Figure 4:
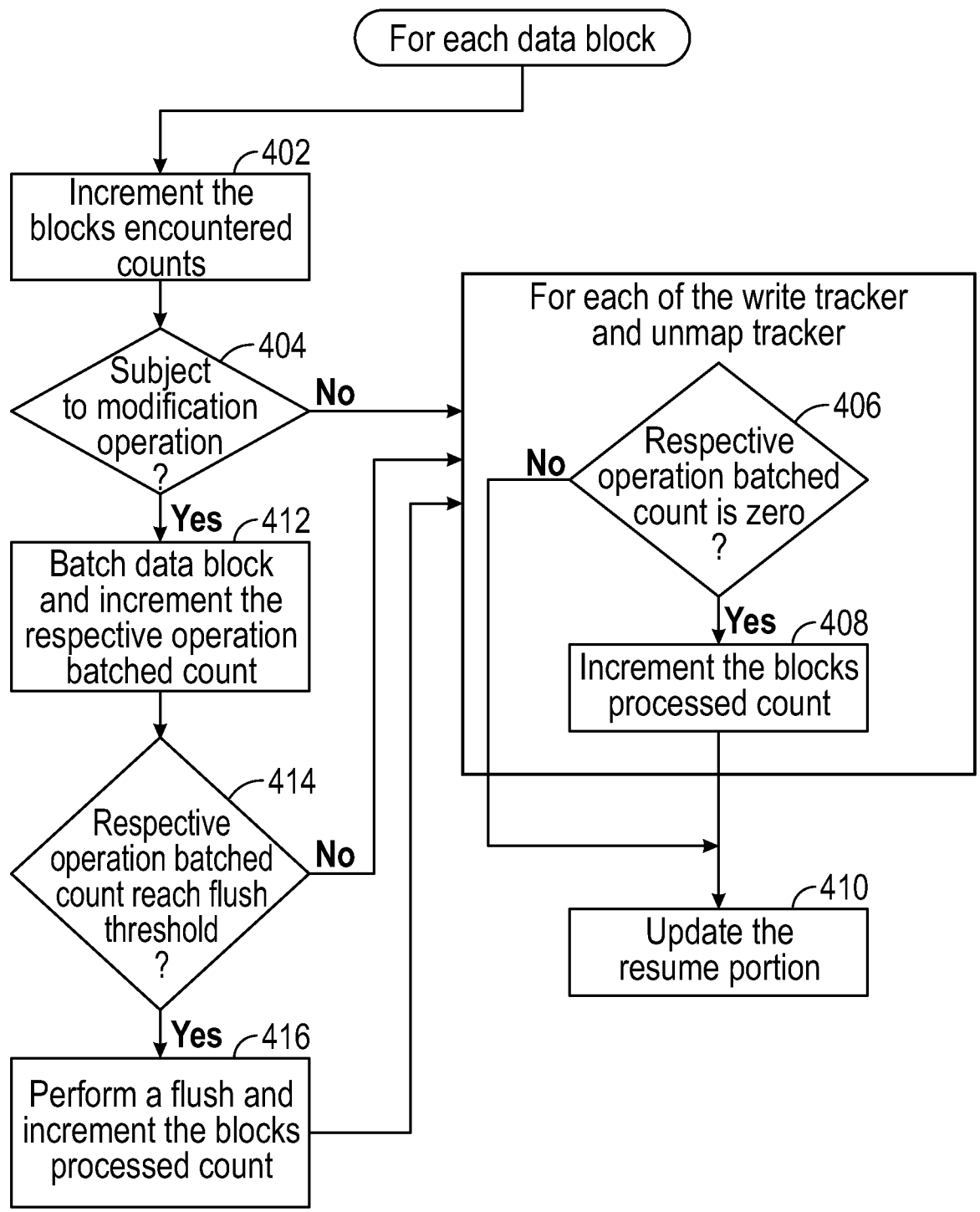
FIG. 4 is a flow diagram of a process according to some examples.

FIG. 4 is a flow diagram of a process performed by the restore service for each data block of the stream 200 encountered by the restore service. The restore service increments (at 402) the blocks encountered counts 208 and 220 in the write tracker 250 and the unmap tracker 252, respectively.

The restore service determines (at 404) if the data block is subject to a modification operation (a write operation or an unmap operation). If the data block is not subject to any modification operation, for each of the write tracker 250 and the unmap tracker 252, the restore service determines (at 406) whether the respective operation batched count (the write batched count 210 in the write tracker 250 or the unmap batched count 224 in the unmap tracker 252) is 0. If so, the restore service increments (at 408) the blocks processed count (214 or 226) in the respective write tracker 250 or unmap tracker 252 by the value of the blocks encountered count 208 or 220. More specifically, if the write batched count 210 in the write tracker 250 is 0, then the restore service increments (at 408) the blocks processed count 214 in the write tracker 250 by the value of the blocks encountered count 208. If the unmap batched count 224 in the unmap tracker 252 is 0, then the restore service increments (at 408) the blocks processed count 226 in the unmap tracker 252 by the value of the blocks encountered count 220. An example of task 408 is shown in FIG. 3B.

The restore service then updates (at 410) the resume portion 108-1 of the tracking data structure 108. The updating of the resume portion 108-1 includes incrementing the resume block index 202 by the minimum value of the blocks processed count 214 in the write tracker 250 and the blocks processed count 226 in the unmap tracker 252. Note that the minimum value can be a zero or a non-zero value.

The updating (at 410) of the resume portion 108-1 further includes incrementing the count 204 of the quantity of write operations by the value of the write flushed count in the write tracker 250 or the unmap tracker 252 with the minimum value of the blocks processed count 214 and the blocks processed count 226. The updating of the resume portion 108-1 further includes incrementing the count 206 of the quantity of unmap operations by the value of the unmap flushed count in the in the write tracker 250 or the unmap tracker 252 with the minimum value of the blocks processed count 214 and the blocks processed count 226. Examples of task 410 are shown in FIGS. 3C and 3O.

If the restore service determines (at 404) that the data block is subject to a modification operation (a write operation or an unmap operation), the restore service batches the data block and increments (at 412) the respective operation batched count (the write batched counts 210 and 222 in the write tracker 250 and the unmap tracker 252, respectively, or the unmap batched counts 212 and 224 in the write tracker 250 and the unmap tracker 252, respectively).

More specifically, if the data block is subject to a write operation, the restore service batches the data block in a batch of write operations and increments (at 412) the write batched counts 210 and 222 in the write tracker 250 and the unmap tracker 252, respectively. If the data block is subject to an unmap operation, the restore service batches the data block in a batch of unmap operations and increments (at 412) the unmap batched counts 212 and 224 in the write tracker 250 and the unmap tracker 252, respectively. Examples of task 412 are shown in FIGS. 3D and 3F.

The restore service determines (at 414) whether the respective operation batched count (the write batched count 210 in the write tracker 250 or the unmap batched count 224 in the unmap tracker 252) has reached the flush threshold. If neither the write batched count 210 in the write tracker 250 nor the unmap batched count 224 in the unmap tracker 252 has reached the flush threshold, the restore service proceeds to tasks 406, 408, and 410.

However, if the restore service determines (at 414) that either the write batched count 210 in the write tracker 250 or the unmap batched count 224 in the unmap tracker 252 has reached the flush threshold, the restore service performs a flush of the batch of write operations or unmap operations, and increments (at 416) the blocks processed count 214 or 226 by the value of the blocks encountered count 208 or 220, respectively. The restore service then proceeds to tasks 406, 408, and 410.

More specifically, if the write batched count 210 in the write tracker 250 has reached the flush threshold, the restore service performs a flush of the batch of write operations, and increments (at 416) the blocks processed count 214 in the write tracker 250 by the value of the blocks encountered count 208. If the unmap batched count 224 has reached the flush threshold, the restore service performs a flush of the batch of unmap operations, and increments (at 416) the blocks processed count 226 in the unmap tracker 252 by the value of the blocks encountered count 220. Examples of tasks 414 and 416 are shown in FIGS. 3H-3J and 3L-3N.

Figure 5:
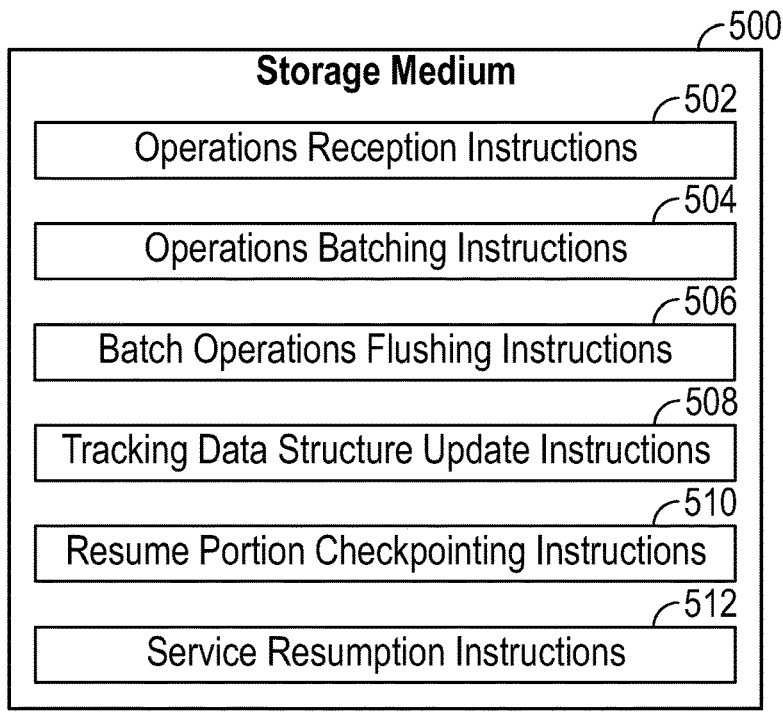
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can include a computer or multiple computers.

The machine-readable instructions include operations reception instructions 502 to receive, as part of a service to update a data store, a collection of operations that are to be performed with respect to the data store. The collection of operations includes a plurality of different types of operations for respective data blocks of the data store. The collection of operations can include a stream of operations in which operations of the different types are interweaved.

The machine-readable instructions include operations batching instructions 504 to batch multiple operations of a respective type of the different types of operations to produce a batch of operations of the respective type. If the batch of operations of the respective type has a threshold quantity of operations of the respective type, batch operations flushing instructions 506 can flush the batch of operations of the respective type to the data store.

The machine-readable instructions include tracking data structure update instructions 508 to progressively update a tracking data structure that tracks batching and flushing of operations of the collection of operations during the service. The tracking data structure includes tracking metrics representing flushes of batches of operations of the different types. In some examples, the tracking metrics include a first batch count (e.g., 210 or 222 in FIG. 2) representing a quantity of operations of a first type that has been encountered during the service, and a second batch count (e.g., 212 or 224 in FIG. 2) representing a quantity of operations of a second type that has been encountered during the service. If there are more than two types of operations, then the metrics can include more than two batch counts. Each batch count can be used to decide whether to flush a batch of operations of the respective type.

In further examples, the tracking metrics include a first processed count (e.g., 214 in FIG. 2) representing a quantity of processed data blocks including data blocks subject to operations of a first type, and a second processed count (e.g., 226 in FIG. 2) representing a quantity of processed data blocks including data blocks subject to operations of a second type.

In further examples, the tracking metrics include a first count (e.g., 204 in FIG. 2) representing a quantity of operations of a first type of the different types that have been processed up to the resume point, and a second count (e.g., 206 in FIG. 2) representing a quantity of operations of a second type of the different types that have been processed up to the resume point.

The machine-readable instructions include resume portion checkpointing instructions 510 to checkpoint a resume portion of the tracking data structure. The resume portion includes an index (e.g., 202 in FIG. 2) identifying a resume point in the collection of operations from which the service can resume after an interruption of the service, and operation type metrics (e.g., 204 and 206 in FIG. 2) indicating, for each corresponding type of the different types of operations, a quantity of operations of the corresponding type that have been flushed up to the resume point.

Checkpointing the resume portion can refer to saving the resume portion to a nonvolatile memory for subsequent retrieval for resuming the service, and/or outputting the resume portion to another entity (such as the service resumption engine 112 of FIG. 1) to use in resuming the service.

The machine-readable instructions include service resumption instructions 512 to, after the interruption of the service, resume the service from the resume point identified by the index in the checkpointed resume portion, and use values of the operation type metrics in the checkpointed resume portion as initial values for the operation type metrics in resuming the service.

Figure 6:
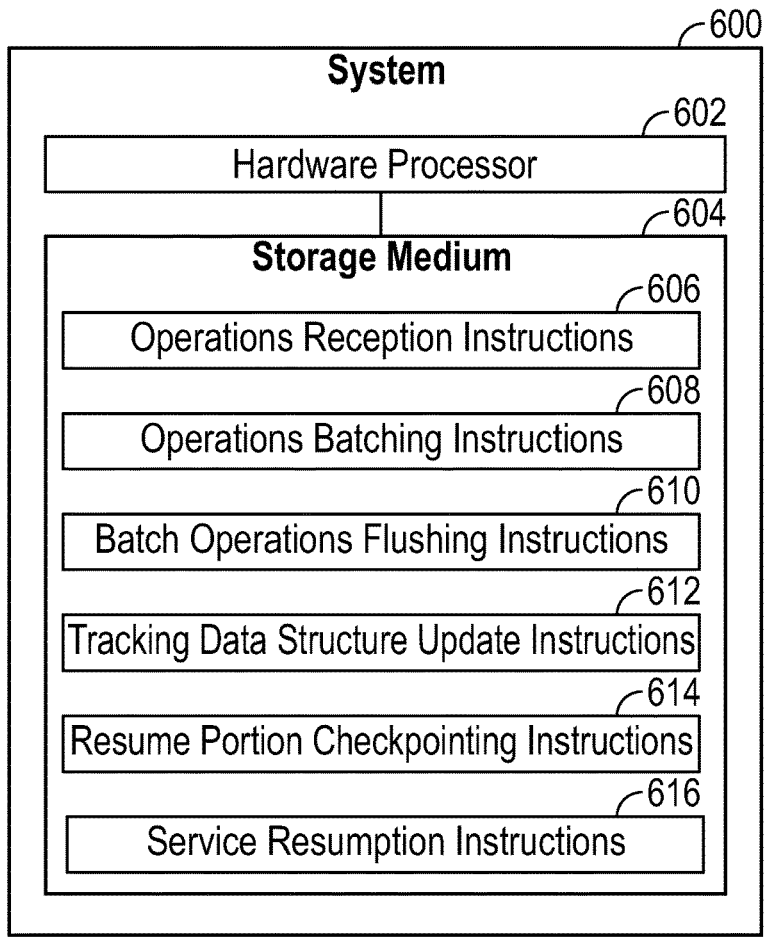
FIG. 6 is a block diagram of a system according to some examples.

FIG. 6 is a block diagram of a system 600 that includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The system 600 includes a storage medium 604 that stores machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include operations reception instructions 606 to receive, as part of a service to update a data store, a stream of operations that are to be performed with respect to the data store. The stream of operations includes a plurality of different types of operations for respective data blocks of the data store.

The machine-readable instructions in the storage medium 604 include operations batching instructions 608 to batch multiple operations of a respective type of the different types of operations to produce a batch of operations of the respective type. The machine-readable instructions in the storage medium 604 include batch operations flushing instructions 610 to flush the batch of operations of the respective type to the data store.

The machine-readable instructions in the storage medium 604 include tracking data structure update instructions 612 to progressively update a tracking data structure that tracks batching and flushing of operations of the stream of operations during the service. Progressively updating the tracking data structure includes updating an index representing a resume point in the stream of operations and updating tracking metrics representing processed data blocks including data blocks that are subject to batches of operations of the different types that have been flushed.

The machine-readable instructions in the storage medium 604 include resume portion checkpointing instructions 614 to checkpoint a resume portion of the tracking data structure. The resume portion includes the index representing the resume point, and operation type metrics indicating, for each corresponding type of the different types of operations, a quantity of operations of the respective type that have been flushed up to the resume point.

The machine-readable instructions in the storage medium 604 include service resumption instructions 616 to, in response to an interruption of the service after the service has processed a data block past the resume point, resume the service from the resume point represented by the index in the checkpointed resume portion, and use values of the operation type metrics in the checkpointed resume portion as initial values for the operation type metrics in resuming the service.

Figure 7:
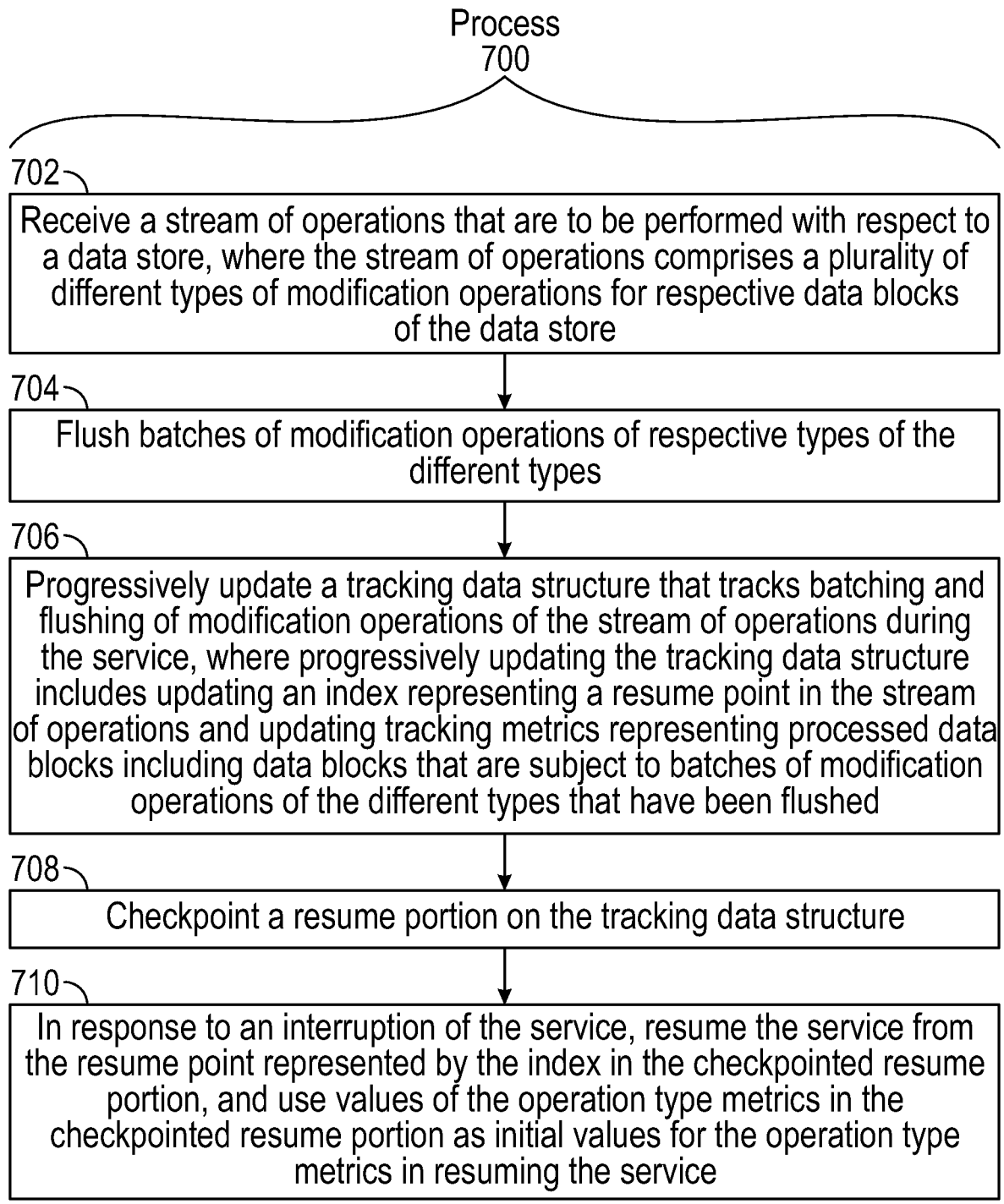
FIG. 7 is a flow diagram of a process according to some examples.

FIG. 7 is a flow diagram of a process 700 according to some examples. The process 700 can be performed by a system including a hardware processor. The process 700 includes receiving (at 702) a stream of operations that are to be performed with respect to a data store, where the stream of operations includes a plurality of different types of modification operations for respective data blocks of the data store. For example, the stream of operations can include interweaved write operations and unmap operations.

The process 700 includes flushing (at 704) batches of modification operations of respective types of the different types. Each batch of modification operations can include a threshold quantity of modification operations.

The process 700 includes progressively updating (at 706) a tracking data structure that tracks batching and flushing of modification operations of the stream of operations during the service. Progressively updating the tracking data structure includes updating an index representing a resume point in the stream of operations and updating tracking metrics representing processed data blocks including data blocks that are subject to batches of modification operations of the different types that have been flushed.

The process 700 includes checkpointing (at 708) a resume portion of the tracking data structure. The resume portion includes the index representing the resume point, and operation type metrics indicating, for each corresponding type of the different types of operations, a quantity of operations of the corresponding type that have been flushed up to the resume point.

The process 700 includes, in response to an interruption of the service after the service has processed a data block past the resume point, resuming (at 710) the service from the resume point represented by the index in the checkpointed resume portion, and using values of the operation type metrics in the checkpointed resume portion as initial values for the operation type metrics in resuming the service.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive, as part of a service to update a data store, a collection of operations that are to be performed with respect to the data store, wherein the collection of operations comprises a plurality of different types of operations for data blocks of the data store;
   batch multiple operations of a respective type of the different types of operations to produce a batch of operations of the respective type;
   flush the batch of operations of the respective type to the data store, wherein the flushing of an operation to the data store comprises performing the operation with respect to the data store such that the data store is modified by the operation and a result of the operation is persisted;
   progressively update a tracking data structure that tracks batching and flushing of operations of the collection of operations during the service, the tracking data structure comprising tracking metrics representing flushes of batches of operations of the different types;
   checkpoint a resume portion of the tracking data structure, the resume portion comprising an index identifying a resume point in the collection of operations from which the service can resume after an interruption of the service, and operation type metrics indicating, for each corresponding type of the different types of operations, a quantity of operations of the corresponding type that have been flushed up to the resume point; and
   after the interruption of the service, resume the service from the resume point identified by the index in the checkpointed resume portion, and use values of the operation type metrics in the checkpointed resume portion as initial values for the operation type metrics in resuming the service.

2. The non-transitory machine-readable storage medium of claim 1, wherein the service is a restore service to restore data from a backup store to the data store, the collection of operations is part of the restore service, and the resume point is a point at which the restore service can resume after an interruption of the restore service.

3. The non-transitory machine-readable storage medium of claim 1, wherein the plurality of different types of operations are interweaved in the collection of operations.

4. The non-transitory machine-readable storage medium of claim 1, wherein the batching of the multiple operations of the respective type is based on a determination that a threshold quantity of operations of the respective type has been encountered during the service.

5. The non-transitory machine-readable storage medium of claim 1, wherein progressively updating the tracking data structure comprises updating a first batch count representing a quantity of data blocks subject to operations of a first type of the different types of operations that has been encountered during the service, and updating a second batch count representing a quantity of data blocks subject to operations of a second type of the different types of operations that has been encountered during the service, and wherein the tracking metrics comprise the first batch count and the second batch count.

6. The non-transitory machine-readable storage medium of claim 5, wherein the instructions upon execution cause the system to:
   decide, using the first batch count in the tracking data structure, whether to flush a batch of operations of the first type.

7. The non-transitory machine-readable storage medium of claim 1, wherein the tracking metrics of the tracking data structure are not checkpointed, and wherein resuming the service comprises initializing the tracking metrics to zero and updating the tracking metrics initialized to zero as data blocks are processed starting at the resume point.

8. The non-transitory machine-readable storage medium of claim 1, wherein progressively updating the tracking data structure comprises:
   updating a first processed count representing a quantity of processed data blocks including data blocks subject to operations of a first type of the different types of operations, and updating a second processed count representing a quantity of processed data blocks including data blocks subject to operations of a second type of the different types of operations, wherein the tracking metrics comprise the first processed count and the second processed count, and
   updating the index in the resume portion of the tracking data structure based on the first processed count and the second processed count.

9. The non-transitory machine-readable storage medium of claim 8, wherein updating the index comprises updating the index using a minimum value of the first processed count and the second processed count.

10. The non-transitory machine-readable storage medium of claim 1, wherein the tracking metrics representing the flushes of batches of operations of the different types comprise a first count representing a quantity of data blocks subject to operations of a first type of the different types that have been processed up to the resume point, and a second count representing a quantity of data blocks subject to operations of a second type of the different types that have been processed up to the resume point.

11. The non-transitory machine-readable storage medium of claim 1, wherein the using of the values of the operation type metrics in the checkpointed resume portion as the initial values for the operation type metrics in resuming the service comprises using values of the first count and the second count in the checkpointed resume portion as initial values for the first count and the second count in resuming the service.

12. A system comprising:
   a hardware processor; and
   a non-transitory storage medium comprising instructions executable on the hardware processor to:

receive, as part of a service to update a data store, a stream of operations that are to be performed with respect to the data store, wherein the stream of operations comprises a plurality of different types of operations for respective data blocks of the data store;

batch multiple operations of a respective type of the different types of operations to produce a batch of operations of the respective type;

flush the batch of operations of the respective type to the data store, wherein the flushing of an operation to the data store comprises performing the operation with respect to the data store such that the data store is modified by the operation and a result of the operation is persisted;

progressively update a tracking data structure that tracks batching and flushing of operations of the stream of operations during the service, wherein progressively updating the tracking data structure comprises updating an index representing a resume point in the stream of operations and updating tracking metrics representing processed data blocks including data blocks that are subject to batches of operations of the different types that have been flushed;

checkpoint a resume portion of the tracking data structure, the resume portion comprising the index representing the resume point, and operation type metrics indicating, for each corresponding type of the different types of operations, a quantity of operations of the respective type that have been flushed up to the resume point; and in response to an interruption of the service after the service has processed a data block past the resume point, resume the service from the resume point represented by the index in the checkpointed resume portion, and use values of the operation type metrics in the checkpointed resume portion as initial values for the operation type metrics in resuming the service.

13. The system of claim 12, wherein the operation type metrics in the checkpointed resume portion comprise a first count representing a quantity of operations of a first type of the different types that have been flushed up to the resume point, and a second count representing a quantity of operations of a second type of the different types that have been flushed up to the resume point.

14. The system of claim 12, wherein the tracking metrics of the tracking data structure comprise a first processed count representing a quantity of processed data blocks including data blocks subject to operations of a first type of the different types of operations, and a second processed count representing a quantity of processed data blocks including data blocks subject to operations of a second type of the different types of operations, and wherein updating the index is based on the first processed count and the second processed count.

15. The system of claim 12, wherein the tracking metrics of the tracking data structure further comprise a first batch count representing a quantity of operations of a first type of the different types of operations that has been encountered during the service, and a second batch count representing a quantity of operations of a second type of the different types of operations that has been encountered during the service.

16. The system of claim 15, wherein the instructions are executable on the hardware processor to:

decide, based on the first batch count, whether to flush a batch of operations of the first type; and decide, based on the second batch count, whether to flush a batch of operations of the second type.

17. The system of claim 15, wherein the tracking metrics of the tracking data structure further comprise a first flushed count representing a quantity of data blocks subject to operations of the first type that have been flushed, and second flushed count representing a quantity of data blocks subject to operations of the second type that have been flushed.

18. The system of claim 12, wherein the instructions are executable on the hardware processor to checkpoint the resume portion to the nonvolatile memory in response to each occurrence of an event.

19. A method comprising:

receiving, by a system comprising a hardware processor, a stream of operations of a service that are to be performed with respect to a data store, wherein the stream of operations comprises a plurality of different types of modification operations for respective data blocks of the data store;

flushing, by the system to the data store, batches of modification operations of respective types of the different types, wherein the flushing of an operation to the data store comprises performing the operation with respect to the data store such that the data store is modified by the operation and a result of the operation is persisted;

progressively updating, by the system, a tracking data structure that tracks batching and flushing of modification operations of the stream of operations during the service, wherein progressively updating the tracking data structure comprises updating an index representing a resume point in the stream of operations and updating tracking metrics representing processed data blocks including data blocks that are subject to batches of modification operations of the different types that have been flushed;

checkpoint a resume portion of the tracking data structure, the resume portion comprising the index representing the resume point, and operation type metrics indicating, for each corresponding type of the different types of operations, a quantity of operations of the corresponding type that have been flushed up to the resume point; and in response to an interruption of the service after the service has processed a data block past the resume point, resuming, by the system, the service from the resume point represented by the index in the checkpointed resume portion, and using values of the operation type metrics in the checkpointed resume portion as initial values for the operation type metrics in resuming the service.

20. The method of claim 19, wherein the operation type metrics comprise a first count representing a quantity of operations of a first type of the different types that have been flushed up to the resume point, and a second count representing a quantity of operations of a second type of the different types that have been flushed up to the resume point.

* * * * *